E. BURHORN.
COOLING TOWER.
APPLICATION FILED JUNE 11, 1909.
978,986.
Patented Dec. 20, 1910.
2 SHEETS—SHEET 1.
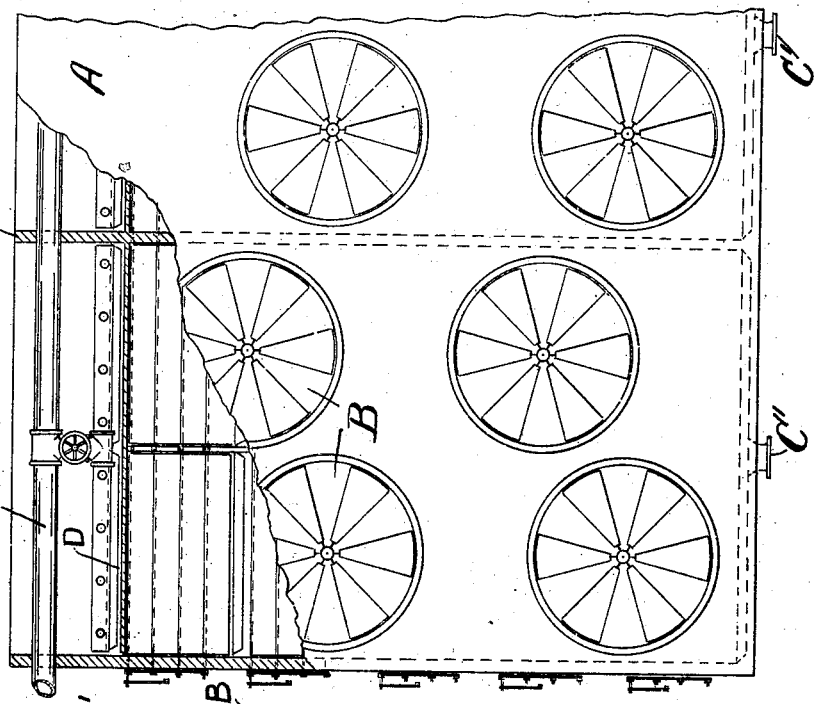
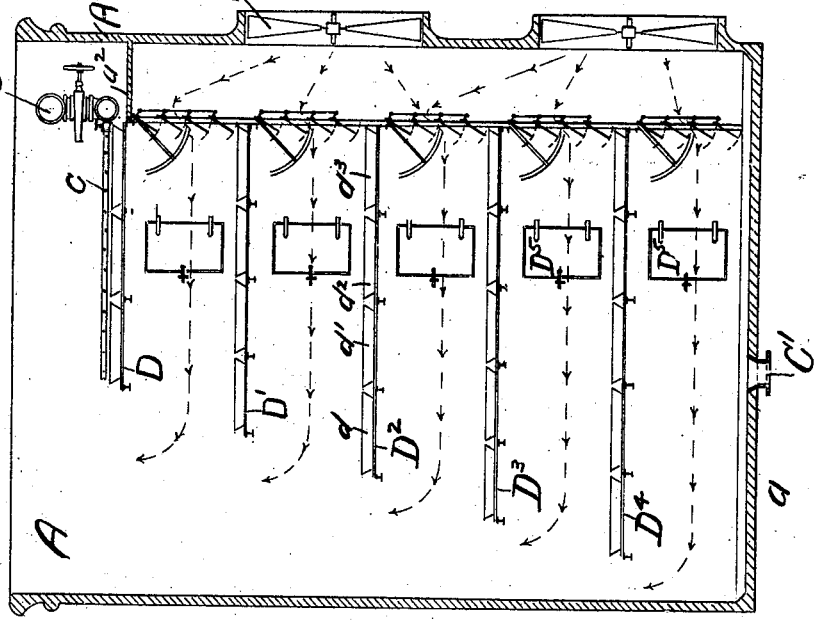
Witnesses
Elizabeth B. King
Lenore T. Hollander
Inventor
Edwin Burhorn
By his Attorney
Donald Campbell

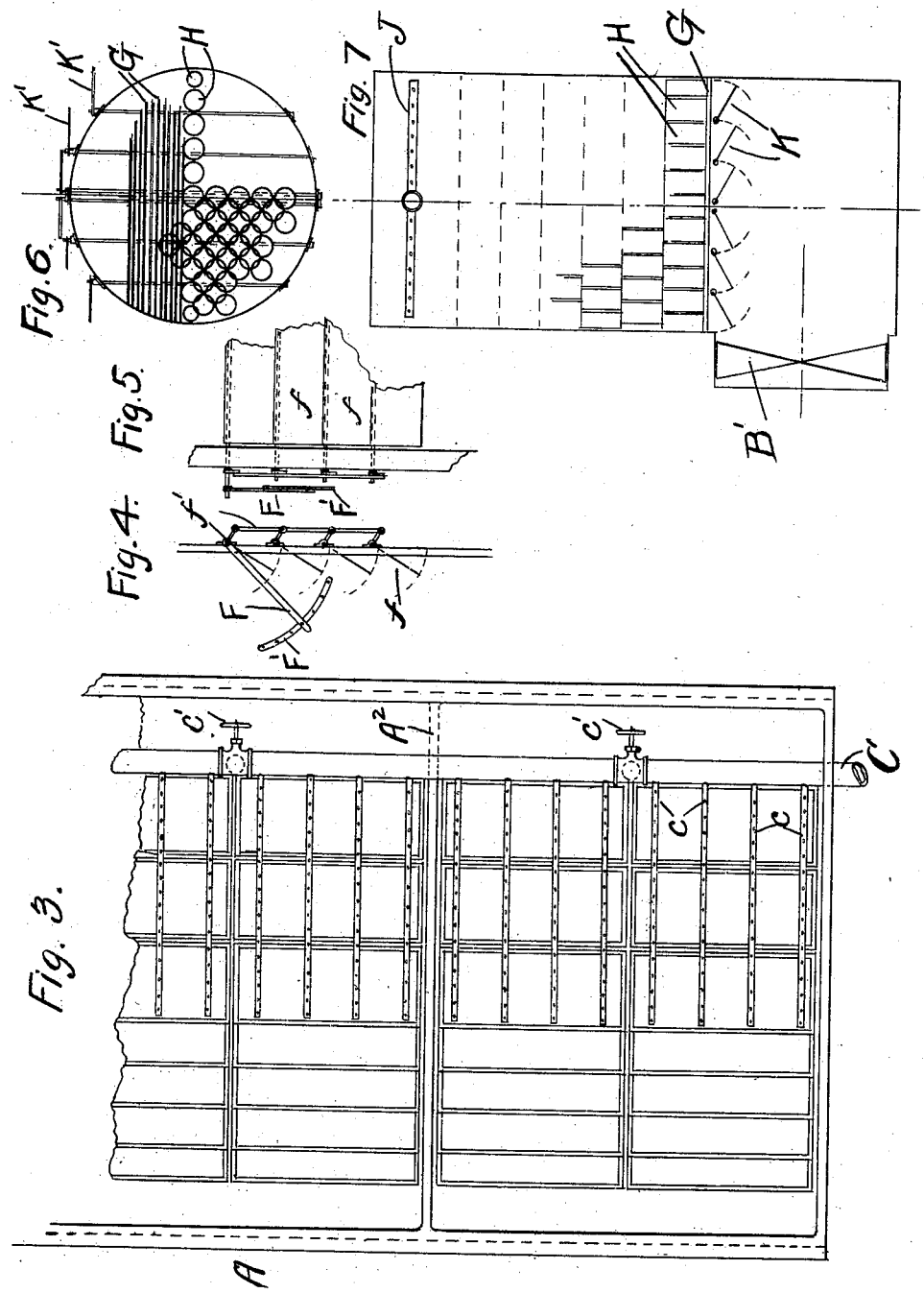

UNITED STATES PATENT OFFICE.

EDWIN BURHORN, OF HOBOKEN, NEW JERSEY.

COOLING-TOWER.

978,986. Specification of Letters Patent. Patented Dec. 20, 1910.

Application filed June 11, 1909. Serial No. 501,488.

*To all whom it may concern:*

Be it known that I, EDWIN BURHORN, a citizen of the United States, residing in the city of Hoboken, county of Hudson, and State of New Jersey, have invented certain new and useful Improvements in Cooling-Towers, of which the following is a specification.

My invention relates to cooling plants, and more particularly to that class known as cooling towers, the purpose of which is to lower the temperature of water which has been heated in some way as in the operation of a condensing steam engine.

My invention contemplates improvements in the form, mode of operation, and construction, as well as the details of cooling towers, and the improvements together with the objects accomplished will appear in the following description.

I will first describe one or more forms of plants embodying my improvements, and will then point out the novel features in the claims.

In the two sheets of drawings accompanying this application, Figure 1 is a side elevation partly in section of a cooling plant embodying my improvements. Fig. 2 is an end elevation of the same, looking toward the end in which the fans or blowers are mounted, said view being partly broken away in order to disclose certain interior details. Fig. 3 is a partial top view of the apparatus shown in Figs. 1 and 2. Figs. 4 and 5 are side and end elevations respectively of a detail, namely, the shutter or louver operating contrivance. Fig. 6 is a top view, and Fig. 7 an elevation showing in a more or less diagrammatical manner a modification of my invention and as applied to another type of cooling tower.

Similar letters of reference designate corresponding parts in the several figures of the drawings.

My invention preferably contemplates an inclosure within which is contained the remainder of the apparatus, and such inclosure may take the form of the housing A, which in Figs. 1 to 3 is seen to consist of a bottom wall $a$ and four side walls, it being open at the top for the purpose of allowing the air to pass outward which has been forced in, as will hereinafter appear. Within the said housing is a system of superposed contrivances or agents whose purpose is to expose the water which is passing through the tower in a most effective manner to the cooling action of the air which is at the same time passing into and out of the housing.

A convenient apparatus for forcing air into the housing and through the system of water exposing agents is a series of blowers or rotary fans B, arranged in any convenient manner in one of the side walls of the housing. The wall A' in which said fans are arranged may be termed the air-admission wall. No special description is required of the said fans save that they may be operated by power as usual to draw atmospheric air inward and force it through the air-admission wall of the housing, so that the air will pass through the system of water exposing agents, having a cooling effect upon the water thereon, and the air finally passing out through the open side or top of the housing.

For convenience the housing may be divided into a series of compartments by means of vertical dividing walls $A^2$, which enables a part or all of the compartments to be employed as may be necessitated by the conditions of weather and climate. The rotary fans B should also be separately operable so that one or more or all of them for a given compartment may at will be put into or out of operation.

So far as the system of water exposing agents is concerned, there are several known systems, and in Fig. 1 I have shown a system which may be described as involving a series of decks carrying pans, the decks being superposed one above the other at proper intervals, and, the water being admitted to the topmost of the pans the result is that the water overflowing or passing through said pans falls through a space traversed by the cooling air until it enters the pan or pans of the deck therebeneath, this action continuing until the water has reached the bottom of the housing where it may be withdrawn in any desired manner.

For admitting the water at the top a suitable system of pipes and valves may be employed, such for example as the large pipe C which extends the entire length of the housing, and which at appropriate intervals has communicating with it a series of smaller and perforated pipes $c$ which extend directly over the topmost of the pan decks. Said pipes $c$ sprinkle the water over the topmost deck or the pans thereon, the water passing downward as described until upon reaching the bottom it is drawn from the housing by means of an exit C'. The pipe C may be provided with valves $c'$ at suitable intervals, whereby a part or all of the sprinkling system may be cut off when desired.

D, D', $D^2$, $D^3$, and $D^4$ indicate a series or system of pan-supporting decks arranged one above the other and each of which supports an appropriate number of pans. For example deck $D^2$ is provided with four pans $d$, $d'$, $d^2$, and $d^3$, each pan being of any suitable construction, for example as illustrated in my co-pending application No. 480,379, filed Dec. 28, 1907, wherein as in this application, the liquid passes through the pans, their bottoms being perforated for this purpose. As in said prior application, a fine meshed fabric may be placed upon each pan.

By examining Fig. 1, it will be seen that the decks and pans are arranged in a peculiar manner, which is for a purpose that I will now explain. The right-hand ends of the several decks are in a vertical line one over the other, whereas on the contrary the left-hand ends all terminate at different points by reason of the topmost deck being shorter in length than the one beneath it, and so on to the bottom deck which is the longest. The result of this is that the distance from the left end of the topmost deck to the far wall of the housing (that is the wall opposite the air-admission wall) is the greatest in extent, while such distance decreases for each of the successively lower decks. Two advantages are gained by this novel arrangement. The arrows seen in Fig. 1 illustrate the direction of the flow of air which is from right to left, it passing between the different decks and in contact with the water which lies in the pans and the water which is falling from deck to deck. The air flow after it passes between the several decks at the left must pass upwardly and escape from the top of the housing. It will thus be seen that the actual volume of air passing upward at the left increases from the bottom upward. In other words, the air passing to the left beneath the lowest deck $D^4$ is added to as it rises by the volume of air passing between decks $D^3$ and $D^4$, and so on. Obviously this increasing volume of air is automatically accommodated by the described arrangement of decks, since the horizontal area through which the air has to pass upward increases from the bottom to the top. A further benefit from the described arrangement is that the decks and pans accommodate themselves to the natural action of the water under the influence of the air currents. Thus the water overflowing from or percolating through the pans on the topmost deck D has a tendency to pass to the left and in fact is blown a substantial distance to the left under the influence of the air currents between decks D and D'. This inclined direction of falling is taken care of all the way from the top to the bottom by the fact that each successively lower deck extends farther to the left than the next deck above it. Above each deck level is a door $D^5$ formed in the side wall of the housing, by which one may enter in order to adjust or remove or repair the pans or other parts, or adjust the shutters or louvers herein to be described.

For purposes which will hereinafter appear I have provided an arrangement of shutters or louvers which may be opened or shut or adjusted at will to suit the necessities. In Fig. 1 is shown a series of such shutters, they being arranged in a substantially vertical line in a location intermediate the air-admission wall and the system of water exposing agents or pans. A substantial space is shown between the two which permits the air forced inward by the fans to appropriately distribute itself prior to its passing through the louvers or shutters and entering the space between the decks. A short wall $a^2$ at the top above the space just referred to aids in this operation and prevents the waste of air by upward escape before passing between the decks.

As shown the series of louvers which are illustrated, have been divided into a plurality of groups, five groups being shown and four louvers appearing in each group. By this arrangement each group may be independently operated either for adjustment or for opening and shutting of the louvers. By this one may control not only the manner and direction in which the air enters the space between the decks, but may at will cut off the air flow from any given space, which is of great advantage in permitting the adaptation of the cooling plant to the variations of temperature and atmosphere which come with the change of seasons.

Referring to the detail views, Figs. 4 and 5, the four louvers in each group will be seen to consist of swinging boards or shutters $f$ pivoted at their upper corners so as to enable them to be opened or closed and set at any desired incline. A parallel link motion is a convenient means of securing the operation in unison of all of the louvers in a single group, and to this end a connecting rod $f'$ is shown which is engaged by a lever with each four of the louvers and also by a handle F which extends inwardly to a point where one may grasp it and throw it to any desired incline for the adjustment of the louvers. An arc F' with a series of pin holes may be employed in connection with a pin for securing the handle F in a desired adjustment.

It will be understood that the several louvers in each group act as air regulators to enable the control of the admission of air from the air driving apparatus to the water-exposing agents, and the means for opening and closing the louvers or shutters constitutes an air regulator adjusting means.

In Figs. 6 and 7 is shown an apparatus in which a different form of water exposing agent is employed. In this apparatus no pans are used. Neither does the air enter by a side wall. On the contrary the air-admission wall is the bottom of the housing, a fan B' serving to force the air therefrom so that it passes upwardly and out at the top. Across the housing of this apparatus near the bottom are a series of bars G extending completely across and shown only in part in Fig. 6. Upon these bars at the bottom are piled a series of or system of earthenware cylinders, the manner of superposing them upon each other being illustrated in a portion of Fig. 6.

At J is shown the pipe which sprinkles the water upon the topmost of the agents H, the water falling, trickling and seeping downwardly against the ascending current of air.

My invention is shown as applied to this apparatus by a series of horizontally arranged louvers K which as above described are operable in groups, there being at K' a series of exterior handles enabling any desired arrangement of the louvers as to their incline or as to their being open or shut.

What I claim and desire to secure by Letters Patent is:

1. In a cooling tower, the combination of a housing having side walls, a system of superposed water-exposing agents within said housing, means for supplying at the housing's upper part the liquid to be cooled whereby it may pass down from agent to agent through the housing to the lower part, a superposed series of air regulators disposed in juxtaposition to said system of agents between the latter and the side wall and spaced from said side wall to form an air pressure chamber therebetween, and air driving apparatus located in said side wall at a height directly opposite one or more of said regulators.

2. In a cooling tower, the combination of a housing having side walls, a system of superposed water-exposing agents within said housing, means for supplying at the housing's upper part the liquid to be cooled whereby it may pass down from agent to agent through the housing to the lower part, a superposed series of air regulators disposed in juxtaposition to said system of agents between the latter and the side wall and spaced from said side wall to form an air pressure chamber therebetween, and air driving apparatus located in said side wall at a height directly opposite one or more of said regulators; said regulators consisting of swinging louvers connected in groups and having a plurality of adjusters therefor, each adjuster having connections for all the louvers in one group.

3. In a cooling tower, the combination of a housing having side walls, a system of superposed water-exposing agents within said housing, means for supplying at the housing's upper part the liquid to be cooled whereby it may pass down from agent to agent through the housing to the lower part, a superposed series of air regulators disposed in juxtaposition to said system of agents between the latter and the side wall and spaced from said side wall to form an air pressure chamber therebetween, and air driving apparatus for forcing air into the chamber between said side wall and regulators; said regulators consisting of swinging louvers connected in groups and having a plurality of adjusters therefor, each adjuster having connections for all the louvers in one group.

In witness whereof I have hereunto set my hand, this 9th day of June, 1909.

EDWIN BURHORN.

Witnesses:
 CONRAD A. DIETERICH,
 ELIZABETH B. KING.